March 30, 1937.  H. P. WICKERSHAM ET AL  2,075,248
SPEAR
Filed Nov. 28, 1933  2 Sheets-Sheet 1
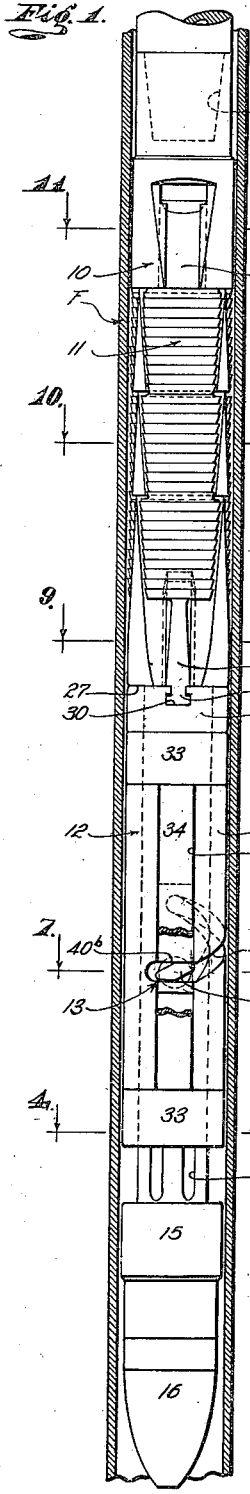
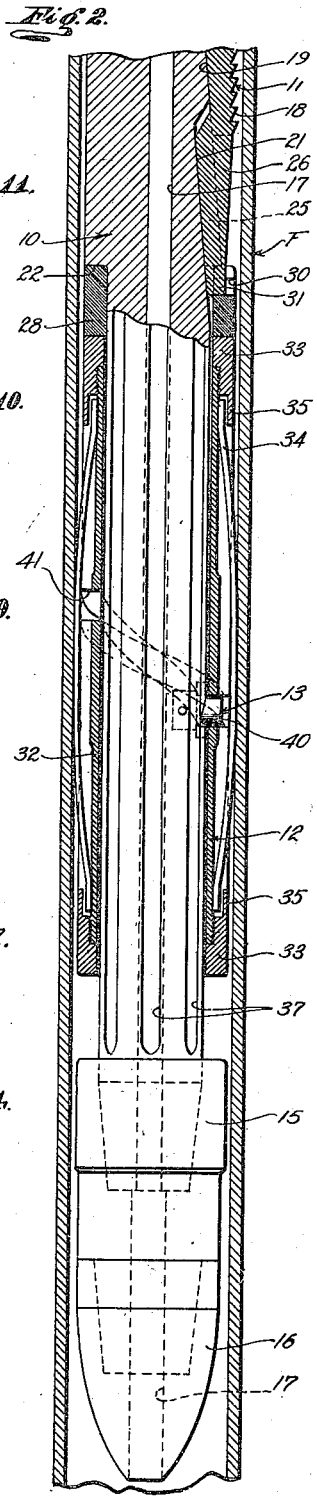
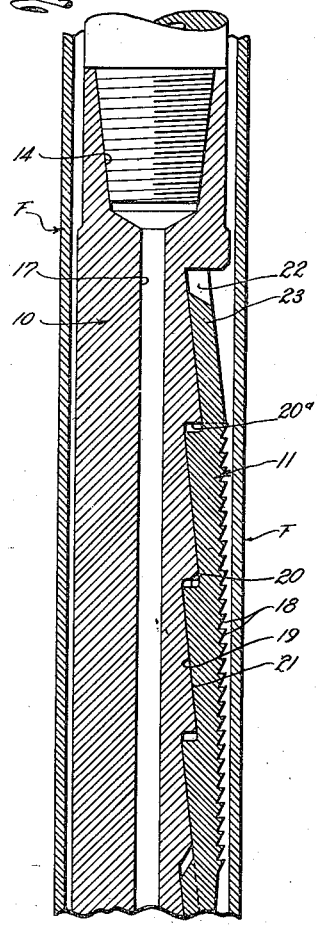
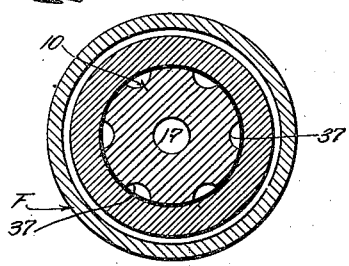
Inventors
Harry P. Wickersham
and Irwin Burns
By
Their Attorney March 30, 1937.    H. P. WICKERSHAM ET AL    2,075,248
SPEAR
Filed Nov. 28, 1933    2 Sheets-Sheet 2

Inventors
Harry P. Wickersham
and Erwin Burns
By
His Attorney

Patented Mar. 30, 1937

2,075,248

UNITED STATES PATENT OFFICE 2,075,248

SPEAR

Harry P. Wickersham, Huntington Park, and Erwin Burns, Los Angeles, Calif.

Application November 28, 1933, Serial No. 700,060

3 Claims. (Cl. 294—96)

This invention relates to a fishing tool and relates more particularly to a spear useful in removing pipe or tubing from wells. It is a general object of this invention to provide a simple, practical spear that is effective and particularly easy to control and operate.

It is another object of the invention to provide a spear that is adapted to grip the interior of a tubular fish in a well to obtain a firm, positive grip thereon for removing the fish from the well, and that may be easily released from the fish in the event that the fish cannot be pulled from the well.

It is another object of the invention to provide a spear that is adapted to obtain a positive grip on the interior of a tubular fish or pipe in a well without distorting, bulging or otherwise damaging the pipe.

It is another object of the invention to provide a fishing spear having long slips for engaging the interior of the pipe or fish and a simple, practical interconnection between the slips whereby they operate in unison to obtain a balanced positive grip on the fish, and whereby they may be easily released from the fish.

It is another object of the invention to provide a spear that may automatically release its gripping slips or condition its gripping slips for contraction in the event that the fishing string breaks or is suddenly dropped.

It is another object of the invention to provide a spear that is released, or that is free to release, from the fish upon the fishing string being permitted to lower or settle.

It is a further object of the invention to provide a fishing spear of the character mentioned that is simple and inexpensive of manufacture, and that is dependable and effective in operation.

Figure 5:
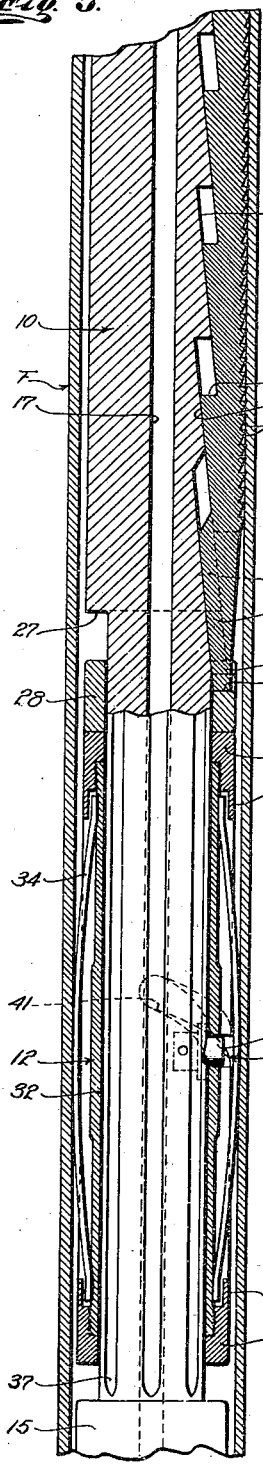
Figure 6:
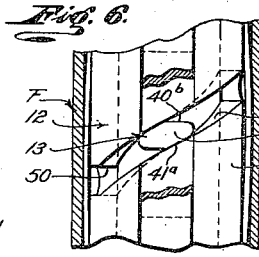
Figure 7:
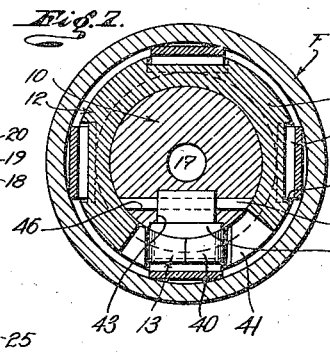
Figure 8:
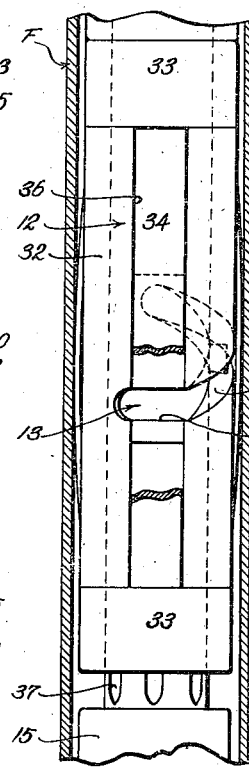
Figure 9:
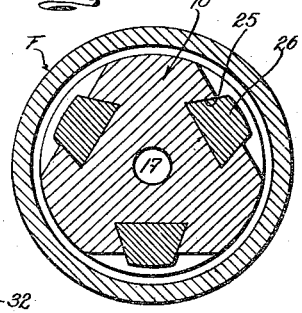
Figure 10:
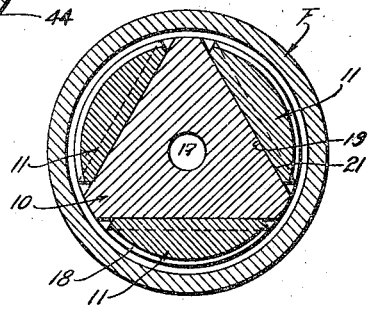
Figure 11:
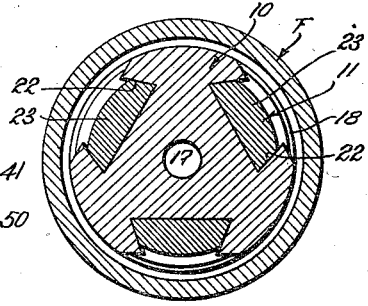

Other objects and features of the invention will be best and more fully understood from the following detailed description of a typical form and application of the invention throughout which description reference is had to the accompanying drawings, in which:

Fig. 1 is a side elevation of the tool provided by this invention showing it in a collapsed or inoperative position in a tubular fish. Fig. 2 is an enlarged side elevation of the lower portion of the tool illustrating the tail piece and a portion of the body in a vertical cross section. Fig. 3 is a longitudinal detailed sectional view of the upper portion of the tool showing the slips in the contracted position. Fig. 4 is an enlarged transverse detailed sectional view taken as indicated by line 4—4 on Fig. 1. Fig. 5 is a view similar to Fig. 2 illustrating the slips in the expanded or gripping position. Fig. 6 is a fragmentary elevation illustrating the pin in the spiralled slot. Fig. 7 is an enlarged detailed, transverse sectional view taken as indicated by line 7—7 on Fig. 1. Fig. 8 is a fragmentary elevation view of the tail piece illustrating it in a position where the slips are actuated, and Figs. 9, 10 and 11 are enlarged, transverse, detailed sectional views taken as indicated by lines 9—9, 10—10 and 11—11, respectively, on Fig. 1.

The spear provided by the invention includes generally a mandrel or body 10, slips or gripping members 11 carried by the body and expansible into engagement with the interior of a fish F, or lost object in a well, upon relative movement between them and the body, a tail piece 12, and a connection 13 between the tail piece 12 and the body 10 for controlling the operation of the gripping members 11.

The mandrel or body 10 is an elongate member, or structure carrying the various other parts of the tool. The body 10 is adapted to be connected with a fishing string of drill pipe, and is provided at its upper end with suitable means for connecting with the string. In the particular case illustrated, a screw threaded socket 14 is provided in the upper end of the body 10 for the reception of the pin of a tool joint, or the like, on the lower end of the fishing string. The body 10 is comparatively long, and is provided at its lower end with means for guiding it into the fish F. A sub, or connecting member 15, may be threaded on the lower end of the body 10, and may carry a bull nose or guide member 16. The guide member 16 is shaped to effectively guide the tool through the well and into the fish F. A central longitudinal fluid passage 17 is provided in the body 10 and extends completely through it to discharge from the lower end of the guide member 16.

The slips or gripping members 11 are provided to grip the interior of the fish F, and are operated between contracted positions and expanded or gripping positions upon relative longitudinal movement between them and the body 10. The tool preferably includes a plurality of gripping members 11. In the form of the invention illustrated in the drawings there are three longitudinally disposed and circumferentially spaced gripping members 11 on the body 10. In the preferred construction, the gripping members 11 are of substantial length and width or circumferential extent to have extensive engagement with the interior of the fish F. The exteriors of the gripping members 11 are convex or curved to conform to the interior of the fish F, and are provided with serrations or gripping teeth 18. A longitudinal series of inclined faces 19 is provided on the inner side of each gripping member 11. The surfaces, or faces 19, are flat, and are inclined downwardly and outwardly relative to the central longitudinal axis of the tool. The faces 19 of each series are stepped—that is, their lower ends terminate in upwardly facing shoulders 20. A complementary or opposing longitudinal series of inclined faces 21 is provided on the exterior of the body 10 for cooperating with the series of faces 19 of each gripping member 11. The faces 21 are of the same pitch, or inclination, as the faces 19, and are preferably of substantially the same extent or area as the faces 19. It is to be noted that the cooperating series of faces 19 and 21 have extensive engagement or cooperation with one another. The points or areas of engagement of the gripping members 11 with the body 10 are spaced longitudinally along the gripping members so that the members are expansible directly radially outwardly upon upward movement of the body 10 relative to the gripping members.

The invention provides novel and effective means for holding the gripping members 11 in their proper positions on the body 10. A dovetailed longitudinal groove 22 extends upwardly from the uppermost shoulder 20ª of each series of faces 21. An upwardly projecting key or tail 23 is provided on the upper end of each gripping member 11 to slidably cooperate with the grooves 22. The tails 23 are dove-tailed, or have divergent sides to slidably cooperate with the dove-tailed side walls of the grooves 22. The body 10 is provided with dove-tailed longitudinal grooves 25 which extend downwardly from the lower end of each series of inclined faces 21. Keys, or tails 26 extend downwardly from the lower ends of the gripping members 11 and slidably fit in the grooves 25. The tails 26 have inwardly divergent sides to slidably cooperate with the inclined side walls of the grooves 25. The inner walls of the grooves 22 and 25 and the inner sides of the tails 23 and 26 have the same pitch and direction of inclination as the series of inclined faces 19 and 21. It will be apparent how the cooperation of the tails 23 with the grooves 22, and the cooperation of the tails 26 with the grooves 25 holds the gripping members 11 on the body 10 for sliding cooperation with the faces 21.

It is a feature of the present invention that the slips or gripping members 11 are interconnected, or connected one with the other, to operate in unison. The portion of the body below the dove-tailed grooves 25 is reduced in diameter so that there is a downwardly facing shoulder 27 on the body at the lower ends of the grooves. A ring 28 is slidable on the body 10 below the shoulder 27. Openings 30 of substantially T-shaped configuration are provided in the upper end of the ring 28. Extensions, or keys, 31 are provided on the lower ends of the tails 26 to cooperate with the openings 30. The keys 31 are substantially T-shaped to have effective cooperation with the openings 30. The keys 31 in fitting the openings 30 connect the lower ends of the gripping members 11 with the ring 28 so that the ring forms a connection between the several gripping members. The fit of the keys 31 in the openings 30 is such as to allow for the expansion and contraction of the gripping members 11.

The tail piece 12 is provided on the body 10 below the ring 28. The tail piece 12 includes a tubular body or sleeve 32, surrounding the body 10. The tail piece sleeve 32 is freely slidable longitudinally and circumferentially on the body. In the preferred construction the sleeve 32 is comparatively long, and is provided at its opposite ends with collars 33. Means is provided on the tail piece 12 to frictionally engage the interior of the fish F to yieldingly resist movement of the tail piece in the fish. In the simple preferred form of the invention illustrated in the drawings, a plurality of longitudinally extending leaf springs 34 is provided on the tail piece 12 for engaging the interior of the tubular fish F. The springs 34 are bowed outwardly to engage or bear against the interior of the fish F. The opposite end portions of the fish engaging springs 34 are received under flanges 35 on the collars 33. The flanges 35 hold the springs 34 against displacement and excessive lateral movement. Longitudinal slots, or grooves 36, are provided in the sleeve 32 to receive the end portions of the springs and to receive the springs 34 when they are contracted or forced inwardly. The springs 34 in pressing or bearing outwardly against the interior of the fish F effectively resist movement of the tail piece 12 relative to the fish. The reduced portion of the body 10 on which the tail piece is arranged may be provided with a multiplicity of longitudinal grooves 37 to provide for the effective lubrication of the tail piece and the clearing of the sliding parts of sand and other solid matter.

The connection 13 between the tail piece 12 and the body 10 may be positioned or set to hold the tail piece and the gripping members 11 against movement on the body as the tool is run into and out of the well, and may be made operative by partial rotation of the body 10. After the connection 13 has been conditioned or rendered operative by partial rotation of the body 10, it is adapted to cause or allow actuation of the gripping members 11 upon an up-pull being put on the body. The connection 13 for controlling the operation of the gripping members 11 includes a projecting part 40 on the body 10 cooperating with a slot 41 in the sleeve 32 of the tail piece. The projecting part 40 may be in the nature of a stud or pin having its inner portion received in a socket 43 in the body 10. A flange 44 may be provided on the pin 40, and may be countersunk in the outer portion of the socket 43, as clearly illustrated in Fig. 7 of the drawings. The outer end or surface of the flange 44 may be curved to be flush with the cylindrical exterior of the body 10. A pin, or lock key 45, may be passed through a transverse opening 46 in the body 10 and a diametric opening in the inner portion of the pin 43 to attach the pin 43 to the body 10. The slot 41 is in the nature of a helical or spiralled opening in the wall of the tail piece sleeve 32. In the particular form of the invention illustrated in the drawings the helical slot 41 is of substantially 180 degrees extent, having its ends at opposite sides of the sleeve 32. The slot 41 is preferably of uniform width throughout its length, and is proportioned to pass or receive the pin 40 with suitable working clearance. The walls of the slot 41 are smooth and regular to have effective cooperation with the pin 40. In practice the pin 40 may have flat faces 41ª of substantially the same pitch as the slot 41 for slidably engaging the walls of the slot and flat substantially horizontal faces 40<sup>b</sup>. The slot 41 may be of any suitable pitch. In the particular case illustrated in the drawings, the slot 41 has a pitch of about 30 degrees.

In accordance with the invention, the lower end portion 50 of the slot 41 is not pitched, but lies in a plane normal to or at right angles to the longitudinal axis of the body 10. When the tail piece 12 is in its up position the pin 40 is received by the straight lower portion 50 of the slot 41, which portion is sufficiently long to receive or carry the pin without having the pin contact the inclined or spiralled wall of the slot. The above mentioned flat substantially horizontal faces 40<sup>b</sup> of the pin 40 are adapted to engage the walls of the slot portion 50. The cooperation of the pin 40 with the straight lower portion 50 of the slot normally releasably holds the tail piece 12 in its up position with respect to the body 10, and accordingly permits the gripping members 11 to remain in their contracted positions. It will be apparent that when the pin 40 is in the straight lower portion 50 of the slot, longitudinal movement of the body 10 does not cause feeding or movement of the tail piece 12.

In operation the tool is run into the well on the lower end of a fishing string of drill pipe with its parts in the positions illustrated in Fig. 1 of the drawings. When the tool is run into the well the pin 40 is in the straight lower portion 50 of the slot 41 so that the tail piece 12 is in its up position, and the gripping members 11 remain in their contracted positions. The guide member 16 is effective in guiding the spear into the fish F, and when the spear has reached a suitable position within the fish the drilling string may be turned a partial rotation in a direction to move the pin 40 out of the straight portion 50 of the slot. The springs 34 of the tail piece 12 resist movement of the tail piece in the fish so that the body 10 may be turned with respect to the tail piece to disengage the pin 40 from the straight lower portion 50 of the tail piece slot. After the pin 40 has been moved out of the straight lower portion of the slot, as just described, the fishing string may be raised or pulled upwardly to cause the pin 40 to cooperate with the walls of the spiralled slot 41. The pitch or inclination of the slot 41 is so steep or great that cooperation of the pin 40 with the walls of the spiralled slot 41 causes the tail piece 12 to turn with respect to the body 10 notwithstanding the resistance to its movement offered by the springs 34 and this turning of the tail piece relative to the body results in relative longitudinal movement between the body and tail piece. The resistance to movement of the tail piece 12 offered by the springs 34 engaging the interior of the fish F although it is overcome by the cooperation of the pin 40 and the walls of the slot insures the turning and feeding of the tail piece on the body when the body is pulled upwardly, as just described. The relative longitudinal movement between the tail piece and the body 10 resulting from the cooperation of the pin 40 and the slot 41 releases the slips or gripping members 11 for engagement with the interior of the fish F. When the gripping members 11 have been released for operation, the fishing string may be pulled upwardly with the desired force to actuate the gripping members 11 outwardly into gripping and lifting engagement with the fish F. When the body 10 is pulled upwardly the cooperation of the series of faces 21 with the series of faces 19 of the gripping members operates the gripping members radially outward against the interior of the fish F, and an upstrain on the fishing string may result in loosening or dislodging of the fish F so that the fish may be pulled upwardly out of the well on the fishing string. In the event that the fish F cannot be loosened and recovered in this manner, it may become necessary or desirable to disengage the spear from the fish. To disengage the spear from the fish F, the fishing string is allowed to lower or settle causing the body 10 to move downwardly with respect to the tail piece 12. This downward movement of the body causes the pin 40 to cooperate with the slot 41 in a manner to turn the tail piece and move the tail piece upwardly with respect to the body. The lowering of the body 10 may be accompanied or followed by slight rotation in a direction to move the pin 40 into the straight lower portion 50 of the slot. Upon the pin 40 being returned to the straight lower portion 50 of the slot, the gripping members 11 are released or disengaged from the interior of the fish F and are held in the retracted positions so that the spear may be pulled upwardly out of the fish without being re-actuated.

It is to be noted that the present invention provides a spear that is dependable and effective in operation, and that is easy to control. The gripping members 11 of the spear may be easily disengaged or released from the fish if it becomes desirable to release the spear from the fish, and the cooperation of the pin 40 with the straight slot portion 50 dependably holds the slips in the contracted position. The connection 13 between the body 10 and the tail piece 12 is such that lowering of the body 10 from any cause, when the gripping members 11 are in their expanded positions, results in upward feeding of the tail piece 12 relative to the body 10 causing the release of the gripping members and turning of the tail piece to return the pin 40 to the straight slot portion 50 so that the gripping members 11 are held in the contracted positions. This feature of the invention is important as it provides for the automatic release or contraction of the gripping members 11 from the fish and the subsequent retaining of the gripping members in their contracted positions in the event that the fishing string is broken when attemping to loosen or pull the fish from the well. The provision of the straight portion 50 of the slot assures the desired retaining of the gripping members 11 in the contracted positions. The gripping members 11 are of substantial length and width so that their engagement with the fish F does not bulge or otherwise distort the fish. The tails on the opposite ends of the gripping members 11 cooperate with dove-tailed slots in the body to retain the slips in proper cooperation with the inclined body faces 21. The connection of the several gripping members 11 with the ring 28 provides for the operation of the gripping members in unison so that they obtain a firm balanced grip on the fish.

Having described only a typical preferred form and application of our invention, we do not wish to limit ourselves to the specific details set forth, but wish to reserve to ourselves any changes or variations that may appear to those skilled in the art, or that fall within the scope of the following claims.

Having described our invention, we claim:

1. A spear including two elements, one a body adapted to run into a tubular fish, the other a tail piece movable upon the body, yieldable springs carried thereon to engage the wall of the fish and to resist movement of the body, a spiral slot being formed in the tail piece, a projection carried by the body member and extending into said slot, the slot and the tail piece having a relatively steep pitch and terminating in a portion lying in the transverse plane of the spear, the pitch of the spiral groove and the transverse portion being such as to prevent relative rotational movement between the body and the tail piece when the spear is moved longitudinally with the projection in the transverse portion of the slot and to produce relative rotation of the parts when the projection is in the spiral portion of the groove and is moved longitudinally or is rotated, an inclined part of the body, and a gripping member having a face cooperating with the inclined part and being related to the tail piece to be controlled in its operation by relative movement between the elements.

2. A spear including a body carrying a plurality of gripping members, a tail piece freely mounted upon the body and operatively connected with the gripping members whereby relative movement between the body and the tail piece will advance or retract the gripping members, means carried by the tail piece and engaging a fish whereby movement of the tail piece with relation to the fish will be resisted, a projection carried by the body, a spiral groove formed in the wall of the tail piece to receive the projection and terminating at its lower end in a straight flat groove portion, whereby the body and the tail piece will retain a non-rotating relationship while the spear moves longitudinally and while the gripping members are in a non-gripping position, the pitch of the spiral groove being such as to produce relative rotation of the tail piece and the body when the projection of the body is within the spiral groove and when the projection is moved either longitudinally or rotationally.

3. A spear including a body having a plurality of longitudinal series of inclined faces, a tail piece movable on the body, a plurality of slips mounted upon the body and having a series of faces cooperating with the inclined faces of the body whereby relative movement of the slips will advance or retract them radially, engaging means between the body and the slips and at the lower ends thereof for holding the slips in slidable relation to the body, an articulate connection between the lower ends of the slips and the tail piece, spring means on the tail piece engaging a tubular fish and tending to resist movement of the tail piece with relation thereto, a spiral slot formed in the tail piece and terminating in a straight portion in a plane transversely of the spear, a projection carried by the body and extending into said slot whereby when the projection is in the straight portion of the slot longitudinal movement of the body or tail piece will not produce relative rotation of said parts, and whereby when the projection is in the spiral portion of the slot longitudinal or rotational movement of either part will produce relative longitudinal movement of the two parts.

HARRY P. WICKERSHAM.
ERWIN BURNS.